United States Patent [19]
Lauven

[11] 4,347,764
[45] Sep. 7, 1982

[54] HYDRAULIC CONTROL VALVE SYSTEM FOR A PLANET GEAR TRANSMISSION PARTICULARLY FOR MOTOR VEHICLES

[75] Inventor: Walter Lauven, Wohnpark, Fed. Rep. of Germany

[73] Assignee: Ford Motor Company, Dearborn, Mich.

[21] Appl. No.: 75,455

[22] Filed: Sep. 14, 1979

[30] Foreign Application Priority Data

Sep. 23, 1978 [DE] Fed. Rep. of Germany ....... 2841507

[51] Int. Cl.³ .................. B60K 41/04; F16H 3/74
[52] U.S. Cl. ............................ 74/867; 74/869; 74/865; 74/752 C; 74/868
[58] Field of Search .......... 74/863, 864, 867, 868, 74/869, 752 C

[56] References Cited

U.S. PATENT DOCUMENTS

| | | | |
|---|---|---|---|
| 2,932,977 | 4/1960 | Ball | 74/868 |
| 3,003,368 | 10/1961 | Winchell | 74/868 |
| 3,022,676 | 2/1962 | Duffy | 74/868 |
| 3,078,736 | 2/1963 | Meads et al. | 74/867 |
| 3,393,585 | 7/1968 | Peirce, Jr. | 74/869 |
| 3,394,622 | 7/1968 | Chana | 74/867 |
| 3,453,908 | 7/1969 | Iijima | 74/867 |
| 3,505,906 | 4/1970 | Lemieux | 74/753 |
| 3,513,727 | 5/1970 | Shimosaki | 74/868 |
| 3,583,259 | 6/1971 | Shimosaki | 74/869 X |
| 3,643,527 | 2/1972 | Ohnuma | 74/868 |
| 3,646,836 | 3/1972 | Kubo et al. | 74/868 |
| 3,675,512 | 7/1972 | Hirozawa | 74/869 |
| 3,714,836 | 2/1973 | Pierce et al. | 74/752 C |
| 3,881,372 | 5/1975 | Miyauchi et al. | 74/867 |
| 4,056,991 | 11/1977 | Sakai et al. | 74/867 X |

Primary Examiner—Leslie Braun
Assistant Examiner—Lawrence J. Gotts
Attorney, Agent, or Firm—Frank G. McKenzie; Donald J. Harrington

[57] ABSTRACT

A control valve system for a planetary transmission having planetary gear elements and clutch and brake means for controlling the relative motion of the gear elements, said clutch and brake means including a second speed ratio brake servo having a double acting piston with a brake apply side and brake release side, a fluid pump driven by the input elements of said transmission, a throttle pressure valve for developing a torque input signal, a source of a driven speed signal, control valves responsive to said signals for controlling distribution of pressure from said pump to said servos, and a servo regulator valve means for modulating the regulated pressure in said circuit in response to changes in said torque signal to develop a controlled pressure on the release side of said second speed ratio servo, whereby the rate of application of said second speed ratio servo is controlled upon application of pressure to the apply side thereof.

4 Claims, 4 Drawing Figures

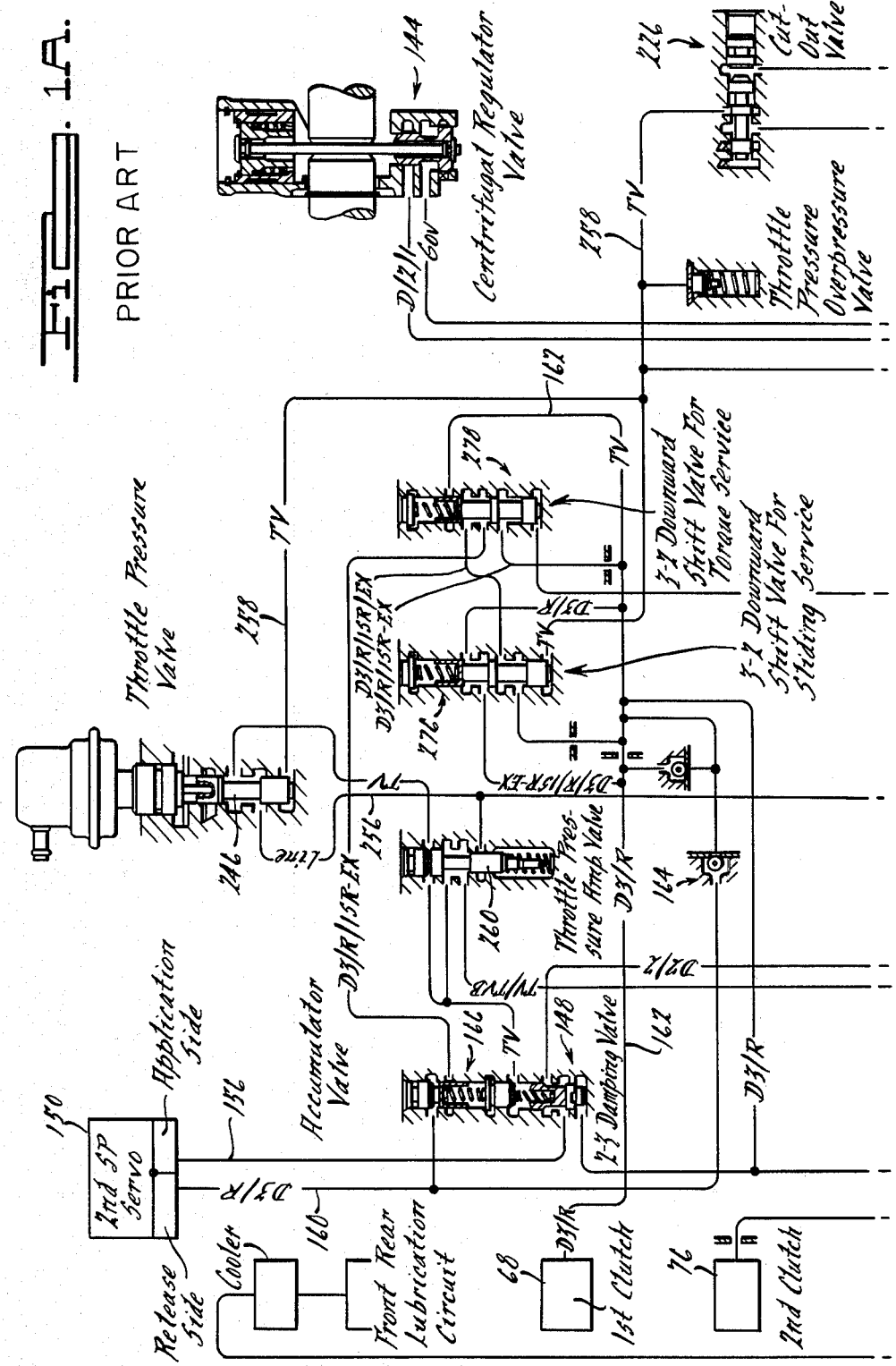

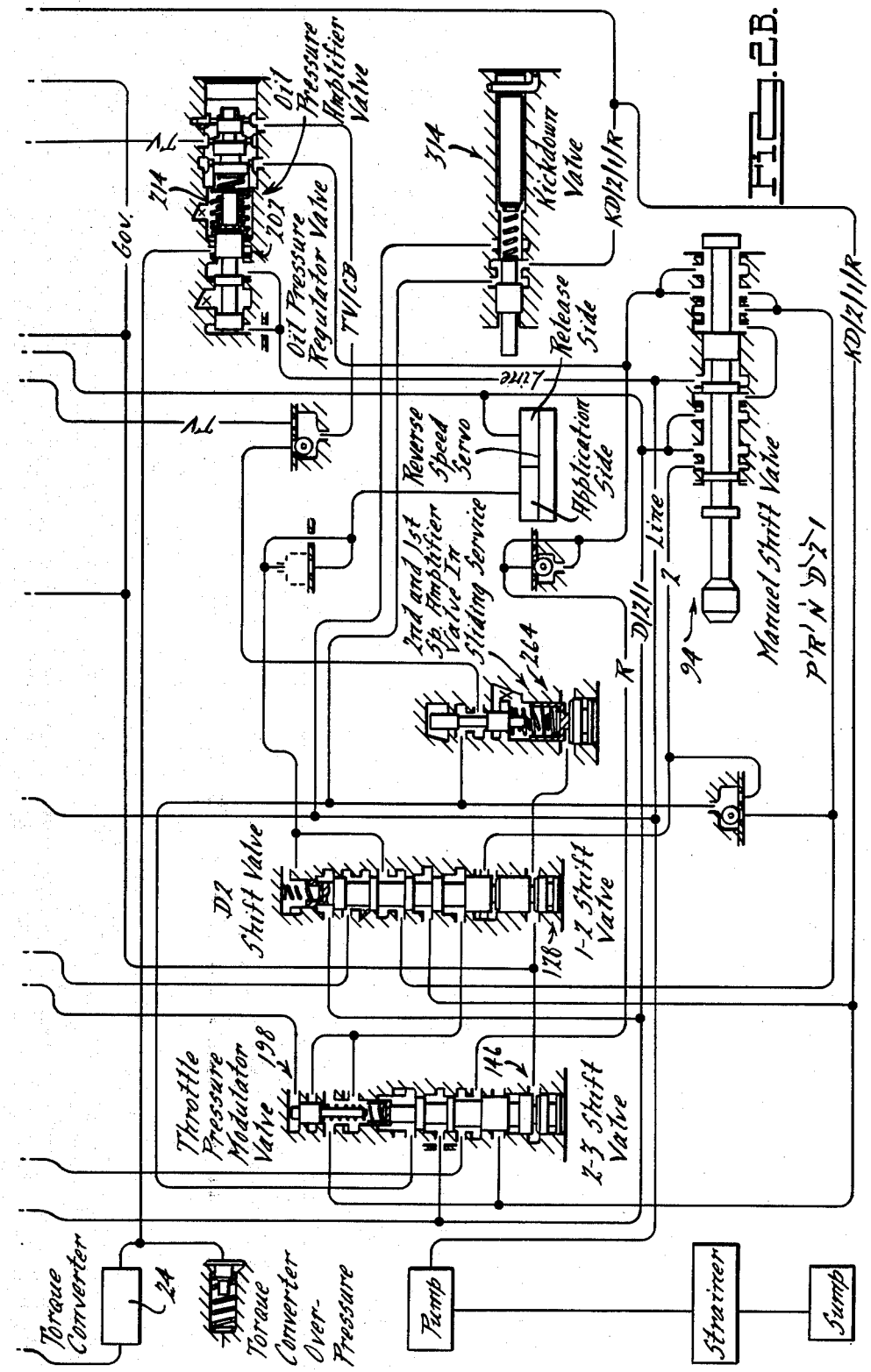

HYDRAULIC CONTROL VALVE SYSTEM FOR A PLANET GEAR TRANSMISSION PARTICULARLY FOR MOTOR VEHICLES

GENERAL DESCRIPTION OF THE INVENTION

My invention comprises improvements in automatic control valve systems of the kind shown in U.S. Pat. Nos. 3,714,836; 3,393,585 and 3,505,906. Such control valve systems include a connection between the apply side of the intermediate servo and the shift valve that controls the shift from a low ratio to an intermediate ratio. As the piston of the intermediate servo is stroked, fluid is displaced from the release side of the servo and develops a cushioning pressure during application of the brake band that establishes intermediate speed ratio operation.

The improvement of the present invention includes a servo regulator valve that controls the magnitude of the pressure on the release side of the intermediate servo during a ratio shift from the low ratio to the intermediate ratio or from a higher ratio to the intermediate ratio. The servo regulator valve comprises a modulating valve spool that is in communication with a source of pressure, such as a fluid pump, and the main pressure regulator valve. The pump pressure in the system is modulated by the servo regulator valve to establish an output signal that is distributed to the release side of the intermediate servo. The servo regulator responds to throttle pressure, which opposes the force of a valve spring. Thus when the engine torque increases, the magnitude of the pressure level in the fluid line leading to the apply side of the servo is increased. When the throttle pressure is low, which corresponds to a low engine torque, the application force of the piston for the second speed servo then is substantially reduced so that the application of the second speed servo occurs gradually. the second speed servo regulator valve can be rendered inactive by distributing to one end thereof an overruling pressure obtained from the portion of the circuit that controls pressure distribution to the high speed clutch.

BRIEF DESCRIPTION OF THE FIGURES OF THE DRAWINGS

FIGS. 1A and 1B show a schematic view of the hydraulic control system described in U.S. Pat. No. 3,714,836 in which the various elements are provided with their corresponding designations, to which are added the reference numerals with which said valves are designated in the patent. In the various lines, letter and numeral insertions are provided which indicate the service states for which the lines carry pressure and the pressure they carry. The entire disclosure of U.S. Pat. No. 3,714,836 is incorporated herein by reference.

FIGS. 2A and 2B show a schematic view of the hydraulic control valve system according to the invention, in which the field to which the invention relates is emphasized. Here again the elements described in U.S. Pat. No. 3,714,836 are provided with their corresponding designations and with their former reference numerals added, whereas the novel valves of the present invention are shown emphasized and are provided with additional reference numerals for which a more detailed explanation is given.

PARTICULAR DESCRIPTION OF THE INVENTION

Figure 1B:
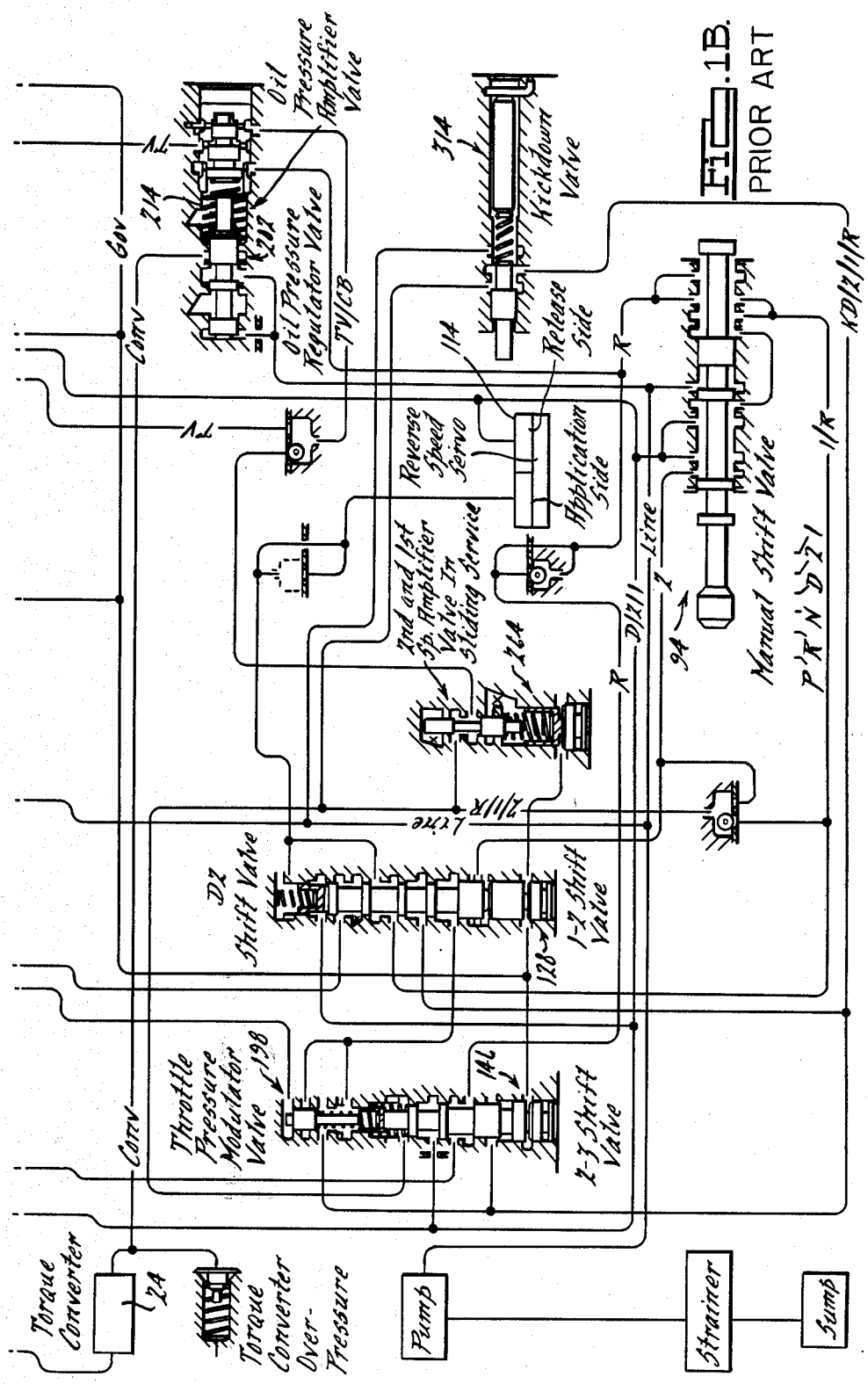
Figure 2A:
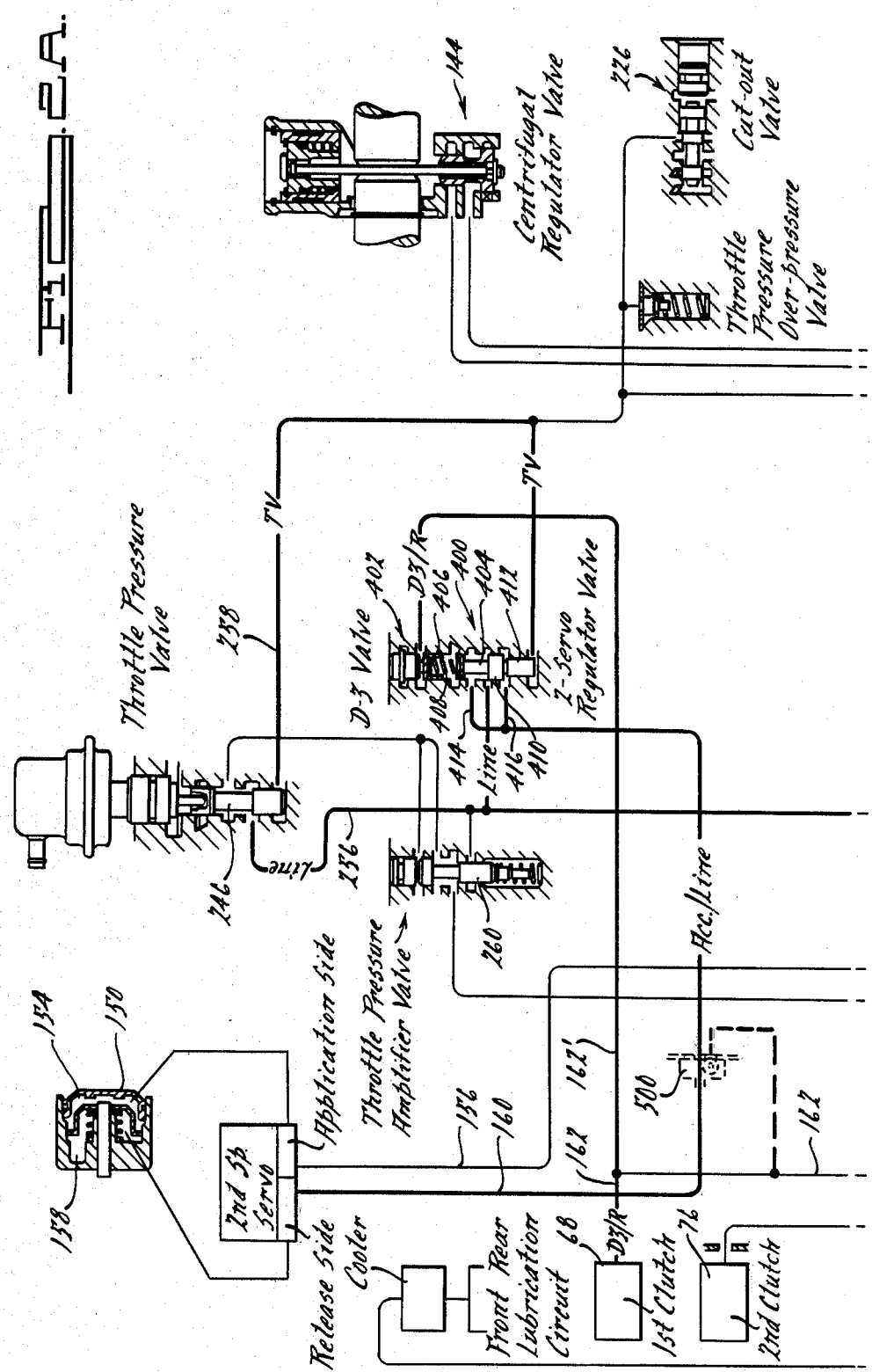

FIGS. 1A and 1B show the known hydraulic control valve system for an epicyclic change-speed gear-box for a motor vehicle, the mode of function of which is explained in all its details in U.S. Pat. No. 3,714,836 and which, therefore, need not be repeated in its full extend here. It is explained only to provide an environment for the hydraulic control valve with which the present invention deals.

Upon comparison with the control valve system of FIGS. 1A and 1B, it will be seen that the majority of the valves, throttle positions and ball check valves provided for controlling a shock-free application of the servo for the second speed have been replaced by a novel 2-servo regulator valve 400 with a superimposed D3 valve 402.

The 2-servo regulator valve 400 is constituted by a regulator valve element 404 and a control valve body 406 which cooperate through a regulator spring 408. The regulator valve element 404 exhibits a large diameter collar 410 and a smaller diameter collar 412.

A signal pressure D3/R acts fistly upon the D3 valve 402 and secondly upon the control valve element 404. The throttle pressure TV acts upon the lower end of the regulator valve element 404, while the line pressure LINE serves as feed pressure and is regulated down to the ACC/LINE pressure. Through regulating pressure lines 414 and 416, modulated line pressure ACC/LINE acts upon the release side 158 of the second speed servo 150. The sequence of the effective surfaces and lines may optionally be modified by surface variations dictated by tuning. The dimensioning of the 2-servo regulator valve 400 is made in such a way that with rising throttle pressure TV a falling accumulator pressure ACC/LINE is adjusted, which becomes effective at the release side of the second speed servo. Said accumulator pressure ACC/LINE counteracts the application pressure and thus determines the application behaviour of the second speed servo.

If this accumulator pressure ACC/LINE is high, which is the case with low throttle pressure TV and correspondingly low engine torque, then the application force of the piston of the second speed servo will be greatly reduced so that the application of the second speed servo occurs correspondingly gently. However, if a high throttle pressure TV prevails, which is the case with correspondingly high engine torque, then the accumulator pressure ACC/LINE is correspondingly low and the application force of the piston of the second speed servo is correspondingly high and ensures reliable application of the second speed servo.

In this way the application force of the piston of the second speed servo can be influenced as a function of the load over the entire accelerator pedal movement, i.e., as a function of the engine torque.

The D3 valve 402 is provided in this case in order to render the two-servo regulator valve 400 inoperative in the presence of a signal pressure D3/R, in order that a rapid release of the second speed servo can occur.

Instead of the D3 valve 402 being superposed on the 2-servo regulator valve 400, a ball check valve 500 may be interposed in the line to the release side of the second speed servo; this is indicated in dashed lines and exhibits a connection to the application side of the first clutch 68. The ball check valve 500 will close the duct of weaker pressure in each case, so that in each case the release side of the second speed servo is loaded simultaneously with the application of the first clutch, which is necessary for the upward shift into the third speed. The D3 valve 402 and its D3/R feed line 162' may be omitted in this case.

It is pointed out that the second speed servo need not be a servo with a stepped piston. On the contrary a simple servo may be used, in which case the release of the servo can be ensured by a back pressure spring on the release side.

Having described a preferred form of the invention, what is claimed is:

1. In a hydraulic control valve system for a multiple-ratio, geared transmission having plural torque delivery paths extending from a driving member to a driven member, said paths being defined by planetary gear elements, clutch and brake means for controlling the relative motion of the gear elements to establish each of several torque ratios in the gearing, said clutch and brake means including a double acting intermediate speed ratio brake and a high speed ratio clutch, said brake being adapted to anchor one element of the gearing to establish a torque reaction point during an underdrive condition, said clutch being engageable selectively to establish a direct-drive, 1:1 ratio, a pressure source comprising a pump driven by said driving member, a valve circuit including a shift valve in said circuit for controlling distribution of pressure from said pump to said clutch and brake means, said brake means including a double acting servo having a piston engageable with a brake friction member, a double working chamber having a portion situated on either side of said piston, said chambers being simultaneously pressurized to establish a brake release condition, one pressure chamber being exhausted to establish a brake apply condition, and an intermediate ratio servo pressure regulator valve means in said circuit including a first passage communicating with the release side of said intermediate ratio servo and another passage communicating with a high pressure portion of said circuit, a modulator valve means for modulating the pressure in said high pressure portion to produce an accumulator pressure in said first passage, a source of a pressure signal that is proportional in magnitude to the input torque for said gearing, means for distributing said pressure signal to said servo regulator valve to control the modulating valve portions acting thereon whereby an increase in the torque related pressure establishes a decrease in the pressure in said accumulator line whereby the servo capacity for said intermediate ratio brake is proportional to the torque input.

2. The combination as set forth in claim 1 wherein said servo regulator valve comprises a modulating valve element and a valve spring acting thereon for establishing a threshold pressure level in said first passage, the force of said spring opposing the force of the torque related signal acting on said servo regulator valve element.

3. The combination as set forth in claim 1 wherein an auxiliary pressure line extends from said high ratio clutch to said servo regulator valve and is adapted to distribute clutch pressure to said servo regulator valve to overrule the modulating function of said servo regulator valve when said clutch is applied during high speed ratio direct drive operation.

4. The combination as set forth in claim 2 wherein an auxiliary pressure line extends from said high ratio clutch to said servo regulator valve and is adapted to distribute clutch pressure to said servo regulator valve to overrule the modulating function of said servo regulator valve when said clutch is applied during high speed ratio direct drive operation.

* * * * *